United States Patent
Ravishankar et al.

(10) Patent No.: US 9,908,109 B2
(45) Date of Patent: *Mar. 6, 2018

(54) ZEOLITE BASED CATALYST COMPOSITION FOR THE REDUCTION OF OLEFINS IN FCC NAPHTHA

(71) Applicant: HINDUSTAN PETROLEUM CORPORATION LIMITED, Mumbai (IN)

(72) Inventors: Raman Ravishankar, Bengaluru (IN); Sunil Mehla, Bengaluru (IN); Peddy Venkata Chalapathi Rao, Bengaluru (IN); Nettem Venkateswarlu Choudary, Bengaluru (IN); Sriganesh Gandham, Bengaluru (IN)

(73) Assignee: Hindustan Petroleum Corporation Limited, Mumbai, Maharashtra (IN)

( * ) Notice: Subject to any disclaimer, the term of this patent is extended or adjusted under 35 U.S.C. 154(b) by 325 days.

This patent is subject to a terminal disclaimer.

(21) Appl. No.: 14/674,467

(22) Filed: Mar. 31, 2015

(65) Prior Publication Data
US 2015/0273451 A1 Oct. 1, 2015

(30) Foreign Application Priority Data
Mar. 31, 2014 (IN) .................. 1231/MUM/2014

(51) Int. Cl.
| | |
|---|---|
| C10G 35/085 | (2006.01) |
| B01J 29/70 | (2006.01) |
| B01J 29/40 | (2006.01) |
| B01J 29/65 | (2006.01) |
| B01J 29/18 | (2006.01) |
| B01J 29/08 | (2006.01) |
| B01J 29/06 | (2006.01) |
| B01J 37/04 | (2006.01) |
| C10G 35/095 | (2006.01) |
| C10G 47/02 | (2006.01) |
| C10G 47/20 | (2006.01) |
| C10G 51/02 | (2006.01) |
| C10G 57/00 | (2006.01) |
| C10G 57/02 | (2006.01) |
| C10G 63/04 | (2006.01) |
| B01J 29/48 | (2006.01) |
| B01J 29/85 | (2006.01) |
| B01J 37/00 | (2006.01) |

(52) U.S. Cl.
CPC ......... *B01J 29/7057* (2013.01); *B01J 29/061* (2013.01); *B01J 29/088* (2013.01); *B01J 29/185* (2013.01); *B01J 29/405* (2013.01); *B01J 29/48* (2013.01); *B01J 29/655* (2013.01); *B01J 37/04* (2013.01); *C10G 35/095* (2013.01); *C10G 47/02* (2013.01); *C10G 47/20* (2013.01); *C10G 51/026* (2013.01); *C10G 57/00* (2013.01); *C10G 57/005* (2013.01); *C10G 57/02* (2013.01); *C10G 63/04* (2013.01); *B01J 29/85* (2013.01); *B01J 37/0009* (2013.01); *B01J 2229/186* (2013.01)

(58) Field of Classification Search
None
See application file for complete search history.

(56) References Cited

U.S. PATENT DOCUMENTS

| | | | | |
|---|---|---|---|---|
| 8,034,973 B2 * | 10/2011 | Goncalvez De Almeida | ............... | B01J 29/088 562/93 |
| 2008/0161621 A1 * | 7/2008 | Riley | ........................ | C07C 2/66 585/468 |
| 2008/0293561 A1 * | 11/2008 | Long | ........................ | B01J 29/06 502/65 |
| 2010/0249479 A1 * | 9/2010 | Berg-Slot | ............... | B01J 23/626 585/489 |
| 2010/0326888 A1 * | 12/2010 | Xu | ........................ | B01J 29/06 208/120.01 |
| 2014/0080697 A1 * | 3/2014 | Long | .................... | B01J 29/0308 502/65 |
| 2015/0209767 A1 * | 7/2015 | Gao | ........................ | C01B 39/24 423/701 |
| 2017/0203285 A1 * | 7/2017 | van Broekhoven | ... | B01J 29/068 |

* cited by examiner

*Primary Examiner* — Tam M Nguyen
(74) *Attorney, Agent, or Firm* — Sand & Sebolt

(57) ABSTRACT

The present disclosure relates to a zeolite based catalyst composition comprising i. at least one rare earth metal, ii. at least one zeolite, and iii. optionally, at least one promoter; wherein, said rare earth metal is impregnated in said zeolite. The amount of said rare earth metal in said composition is in the range of 0.1 to 20 w/w %. The present disclosure also relates to a process for preparing a catalyst composition. Further, the present disclosure relates to a process for reducing olefin content in a hydrocarbon stream using the catalyst of the present disclosure.

7 Claims, No Drawings

ABSTRACT# ZEOLITE BASED CATALYST COMPOSITION FOR THE REDUCTION OF OLEFINS IN FCC NAPHTHA

FIELD OF THE DISCLOSURE

The present disclosure is directed to a zeolite based catalyst composition and a process for preparing the same. The present disclosure is also directed to a process for reducing the olefin content in a hydrocarbon stream by using the zeolite based catalyst composition.

BACKGROUND

Petroleum refiners produce desirable product/s by hydrocracking a hydrocarbon feedstock. Hydrocracking is accomplished by contacting the hydrocarbon feedstock, hydrogen and a hydrocracking catalyst at an elevated temperature and pressure to obtain a desired product/s. Most of today's hydrocracking processes are based on zeolite catalysts. The zeolite catalysts used for hydrocracking consists of two components namely, hydrogenation component and acid component. The hydrogenation component consists of Group VIII noble metals optionally in a combination with Group VIII and/or Group VIB metals whereas the acidic component consists of zeolites, amorphous silica-alumina gel, transition alumina or aluminosilicate. The acidic component of the zeolite catalyst provides a support to the hydrogenation components and acts as a cracking catalyst. Such zeolites, to be useful for hydrocracking the hydrocarbon feedstock, should remain active and stable for longer time duration to completely convert the feed stock into the desired product/s.

However, currently available catalysts though stable and selective are not active enough to completely convert the olefins into higher octane components such as isoparaffins, naphthenes or aromatics. These unconverted olefins remain in the final product and adversely affect the quality and the functioning of the final product. For instance, the unconverted olefins present in the gasoline are detrimental to the engine of a vehicle as they form a sticky gum. Further, the unconverted olefins in the gasoline also contribute to the environmental pollution.

Therefore, there is a need for a composition that is capable of converting the olefins present in the hydrocarbon stream into the desired products.

OBJECTS

Some of the objects of the present disclosure, which at least one embodiment herein satisfies, are as follows:

It is an object of the present disclosure to provide a zeolite based composition.

It is another object of the present disclosure to provide a zeolite based composition which is useful for conversion of olefins into the desired products.

It is still another object of the present disclosure to provide a simple process for preparing a zeolite based composition.

It is still another object of the present disclosure to provide a simple process for converting olefins into the desired products which employs a zeolite based composition.

Other objects and advantages of the present disclosure will be more apparent from the following description which is not intended to limit the scope of the present disclosure.

SUMMARY

In accordance with one aspect of the present disclosure there is provided a zeolite based catalyst composition comprising:
 a. at least one rare earth metal; and
 b. at least one zeolite,
 wherein, the amount of said rare earth metal is in the range of 0.1 to 20 w/w %.

The rare earth metal is impregnated in said zeolite.

Typically, the ratio of $SiO_2$ to $Al_2O_3$ in said zeolite ranges from 1:20 to 1:450.

The catalyst composition of the present disclosure can further comprise at least one promoter selected from the group consisting of cerium, niobium, cesium, sodium, potassium and rubidium in an amount ranging from 0.01 to 1.5 w/w %, In accordance with another aspect of the present disclosure there is provided a process for preparing the catalyst composition, said process comprising the following steps:
 i. mixing at least one zeolite and at least one rare earth metal salt to obtain slurry,
 ii. removing the aqueous medium to obtain a dried mass, and
 iii. calcining the slurry to obtain a the zeolite based composition having the amount of said rare earth metal in the range of 0.1 to 20 w/w %.

The process of the present disclosure can further comprise mixing at least one promoter selected from the group consisting of cerium, niobium, cesium, sodium, potassium and rubidium in step (i) in an amount ranging from 0.01 to 1.5 w/w %.

Typically, the ratio of $SiO_2$ to $Al_2O_3$ in said zeolite ranges from 1:20 to 1:450. In accordance with yet another aspect of the present disclosure there is provided a process for reducing the olefin content in a hydrocarbon stream, said process comprising the following steps;
 i. providing at least one hydrocarbon stream comprising olefins in an amount ranging from 0.01 to 70 w/w %, and
 ii. contacting said hydrocarbon stream with the catalyst composition of claim 1, at a temperature of 350 to 450° C. and at a pressure of 1 bar to 20 bars in the presence of at least one carrier gas to obtain the hydrocarbon stream comprising at least 40 w/w %, preferably 65 w/w % reduced olefin content.

DETAILED DESCRIPTION

The catalyst composition described herein includes at least one rare earth metal impregnated in at least one zeolite. The performance or the activity of the composition depends on the specific proportion of the individual components of the composition with respect to each other. Accordingly, the ratio of silicon dioxide (SiO2) to aluminium oxide (Al2O3) is selected in the range of about 1:20 to about 1:450.

The content of rare earth metal in the composition is selected depending on various parameters which may include content of the olefins in the hydrocarbon stream, conversion of olefins into desired product/s and the like. Accordingly, the content of rare earth metal in the composition is varied from about 1 w/w % to about 20 w/w %. The rare earth metal useful for the purpose of the present invention is in a salt form. The cation of the rare earth metal salt is selected from the group consisting of scandium, yttrium, lanthanum, praseodymium, neodymium, promethium, samarium, europium, gadolinium, terbium, dysprosium, holmium, erbium, thulium, ytterbium and lutetium. The anion of the salt is selected from the group consisting of chloride, bromide, fluoride, iodide, sulfates, phosphates, phosphonates, nitrates, nitrites, carbonates, acetates, bicarbonates, hydroxides and oxides. Preferably, lanthanum nitrate is used as a salt to provide rare earth metal to the composition.

The zeolite on which the composition of the present invention is based is at least one selected from the group consisting of ZSM-5, ZSM-11, ZSM-48, ZSM-57, SAPO-5, SAPO-11, SAPO-17, SAPO-18, SAPO-34, SAPO-44, ferrierite, mordenite, beta, Y. The choice of the zeolite in the composition depends on the type and contents of hydrocarbon stream which is to be subjected for the conversion of olefins into desired product/s.

The composition of the present disclosure may also comprise at least one promoter. Examples of the promoter useful for the purpose of the present disclosure are cerium, niobium, cesium, sodium, potassium, rubidium and combinations thereof. The promoter when present in the composition of the present disclosure is in an amount from 0.01 to 1.5 w/w %.

The composition described herein is prepared by a simple process. The process involves a step of mixing the starting materials in the desired/predetermined proportions. The starting materials i.e., at least one zeolite, a solution containing at least one source of rare earth metal salt and optionally, at least one promoter are mixed with stirring to obtain a mixture. The promoter used is at least one selected from the group consisting of cerium, niobium, cesium, sodium, potassium and rubidium in step (i). The amount of promoter ranges from 0.01 to 1.5 w/w %. The mixture is stirred at a temperature of about 20° C. to 40° C. to obtain thick slurry. The solvent is removed to obtain a dried mass. The solvent may be removed by any techniques known to a person of ordinary skill in the art which include but is not limited to drying, distillation, vacuum distillation. The dried material, which still contains traces of solvent, is calcined at about 550° C. till a constant weight of the dried mass is achieved. The calcined mass is then ground to obtain the zeolite based catalyst composition.

The term mixture, mixing or mixed or synonyms thereof in the context of the present disclosure would mean physical mixtures, admixtures or intergrowths of the components therein.

The conversion of olefins present in the hydrocarbon stream can be performed by employing the composition of the present disclosure under reaction conditions including a temperature from about 350° C. to about 450° C., a pressure of from about 1 bar to about 20 bars, and a space velocity of from about 1 WHSV to about 50 WHSV. The hydrocarbon stream contains olefins in the range of 0.01 to 70 w/w % and is selected from the group consisting of gasoline, vacuum gas oil (VGO), light cycle oil (LCO) and naphtha.

The present disclosure is further described in light of the following non-limiting examples which are set forth for illustration purpose only and are not to be construed for limiting the scope of the disclosure.

The process for preparing the composition of the present invention is illustrated in Example 1 given below. Example 2 illustrates the use of the composition as a catalyst in the conversion of olefins.

EXAMPLE 1

General Method for the Preparation of the Composition of the Present Disclosure 5 gm of dried zeolite was mixed with, 0.5 M solution of rare earth metal salt in varying proportion to obtain slurry. The slurry was stirred at 25° C. for 3 hours to obtain thick slurry. The thick slurry was evaporated in a rotary evaporator at 75° C. under vacuum to obtain a dried mass which was calcined at 550° C. for 5 hours. The calcined mass was ground into fine powder, pressed into a pellet and sieved to collect the composition having varying loadings of rare earth metal salt on the zeolite. The particle size of the composition ranges between 600 μm ad 800 μm.

The proportion of the components with respect to the other and the results of the use of the composition as a catalyst as per the process provided in Example 2 for converting olefins are provided in table 3 given below.

EXAMPLE 2

The Conversion of Olefin Present in the Hydrocarbon Stream by Using the Composition of the Present Disclosure as a Catalyst The conversion of olefin was carried out using cracked naphtha as a hydrocarbon stream obtained from FCC U. The composition of the hydrocarbon stream is as given in table 1 given below:

TABLE 1

Composition of the cracked naphtha i.e., hydrocarbon stream

| Sr. No | Particulars | w/w % |
|---|---|---|
| 1 | Paraffins | 33.18 |
|   | Iso-Paraffins |  |
| 2 | Olefins | 12.19 |
| 3 | Cyclo Olefins | 3.14 |
| 4 | Naphthenes | 9.34 |
| 5 | Aromatics | 42.08 |

The conversion reaction was carried out in a fixed bed down-flow reactor unit with a high pressure liquid gas separator. The liquid products obtained are weighed using an integrated balance. The liquid products were analyzed by bromine number method (ASTM: D1159-07) and by detailed hydrocarbon analysis/PIONA. The reaction parameters are provided in the table 2 below:

TABLE 2

Reaction parameters for the conversion of olefins by using the composition of the present disclosure

|  | Parameter-01 |
|---|---|
| Temperature (° C.) | 400 |
| Pressure | 1 atm |
| Carrier Gas | Nitrogen |
| Feed | cracked naphtha |
| Feed flow rate (ml/h) | 12 |
| WHSV ($h^{-1}$) | 9.12 |

Table 3: The proportion of the components with respect to the other and the results of the use of the composition as a catalyst as per the process provided in Example 2

TABLE 3A

The zeolite ZSM-5 compositions with varying $SiO_2/Al_2O_3$ ratios

|  |  |  |  |  | Results of the use of the composition as per Example 2 parameter-01 | |
|---|---|---|---|---|---|---|
| No. | Zeolite | $SiO_2/Al_2O_3$ | Rare Earth Metal | Rare Earth Loading (wt. %) | Olefin reduction w/w % | % Cracked gases |
| 1. | ZSM-5 | 23 | La | 5 | 86.8 | 22.8 |
| 2. | ZSM-5 | 30 | La | 5 | 83.1 | 20 |
| 3. | ZSM-5 | 50 | La | 5 | 67.2 | 19 |
| 4. | ZSM-5 | 80 | La | 5 | 65.9 | 18.5 |
| 5. | ZSM-5 | 107 | La | 5 | 60 | 17.9 |
| 6. | ZSM-5 | 280 | La | 5 | 55.9 | 16 |
| 7. | ZSM-5 | 408 | La | 5 | 35.5 | 17.6 |

TABLE 3B

The compositions with varying rare earth metal loading.

|  |  |  |  |  | Results of the use of the composition as per Example 2 parameter-01 | |
|---|---|---|---|---|---|---|
| No. | Zeolite | $SiO_2/Al_2O_3$ | Rare Earth Metal | Rare Earth Loading (wt. %) | Olefin reduction w/w % | % Cracked gases |
| 8. | ZSM-5 | 30 | La | 1 | 86.8 | 40 |
| 9. | ZSM-5 | 30 | La | 2.5 | 84.3 | 22 |
| 10. | ZSM-5 | 30 | La | 5 | 83.1 | 20 |
| 11. | ZSM-5 | 30 | La | 7.5 | 83.4 | 17 |
| 12. | ZSM-5 | 30 | La | 10 | 83.6 | 10.4 |

TABLE 3C

The compositions comprising various types of zeolite

|  |  |  |  |  | Results of the use of the composition as per Example 2 parameter-01 | |
|---|---|---|---|---|---|---|
| No. | Zeolite | $SiO_2/Al_2O_3$ | Rare Earth Metal | Rare Earth Loading (wt. %) | Olefin reduction w/w % | % Cracked gases |
| 13. | ZSM-5 | 30 | — | — | 87 | 39 |
| 14. | ZSM-5 | 30 | La | 5 | 83.1 | 20 |
| 15. | Ferrierite | 20 | — | — | 86 | 40 |
| 16. | Ferrierite | 20 | La | 5 | 80 | 20 |
| 17. | Mordenite | 20 | — | — | 41 | 8 |
| 18. | Mordenite | 20 | La | 5 | 18 | 6 |
| 19. | Beta | 25 | — | — | 39.7 | 7 |
| 20. | Beta | 25 | La | 5 | 39 | 15 |
| 21. | Y | 12 | — | — | 62 | 9 |
| 22. | Y | 12 | La | 5 | 75 | 9 |

EXAMPLE 3

The reactions were carried out using feedstock-02 as given in Table 4a and using the catalyst compositions as listed in Table 4b. The reactions were carried out under nitrogen pressure of 20 bars and hydrogen flow.

TABLE 4a

| Feedstock-02 | |
|---|---|
| Olefins | 42.3 |
| n-Paraffins | 3.7 |
| i-Paraffins | 15.4 |
| Naphthenes | 11.1 |
| Aromatics | 9.7 |
| Others | 11.6 |

EXAMPLE 3a

H-ZSM-5 with SiO2/Al2O3 ratio of 30 was prepared by loading 5% lanthanum and 1% Cerium. The reaction was carried out at 400° C. at atmospheric pressure using hydrogen as a carrier gas.

EXAMPLE 3b

The catalyst listed in example 3a was tested at similar conditions except the pressure being 20 bars with nitrogen.

EXAMPLE 3c

The catalyst listed in example 3a was used except for the SiO2/Al2O3 ratio of 23 was used and tested as same conditions listed in example 3b.

The results are presented in table 4b.

|  | Feedstock-02 | Example 3a | Example 3b | Example 3c |
|---|---|---|---|---|
| Olefins | 42.3 | 30.9 | 17.6 | 26.1 |
| n-Paraffins | 3.7 | 4.4 | 1 | 3.2 |
| i-Paraffins | 15.4 | 18.3 | 17.9 | 17.1 |
| Naphthenes | 11.1 | 14.5 | 21 | 18.4 |
| Aromatics | 9.7 | 17.3 | 28.5 | 23.5 |
| Others | 11.6 | 12.7 | 13 | 11.8 |

The H-ZSM-5 catalyst was loaded with another rare earth metal, Niobium as a promoter in addition to 5% Lanthanum and the reactions were carried out using feedstock-02 with the composition as listed in table 4a and details are given in the following examples.

EXAMPLE 4a

H-ZSM-5 with SiO2/Al2O3 ratio of 30 was prepared by loading 5% lanthanum and 1% Niobium. The reaction was carried out at 400° C. using hydrogen as carrier gas and at atmospheric pressure.

EXAMPLE 4b

The catalyst listed in example 4a was tested at similar conditions except the pressure being 20 bars with nitrogen.

|  | Feedstock-02 | Example 4a | Example 4b |
|---|---|---|---|
| Olefins | 42.3 | 25.7 | 26 |
| n-Paraffins | 3.7 | 4.2 | 7.3 |
| i-Paraffins | 15.4 | 18.5 | 16.8 |
| Naphthenes | 11.1 | 16.3 | 17.3 |
| Aromatics | 9.7 | 19.2 | 21.7 |
| Others | 11.6 | 12.5 | 6.7 |

EXAMPLE 4c

The catalyst detailed in example 4a was tested under atmospheric pressure with only nitrogen as carrier gas. The olefin content was reduced by 73%.

EXAMPLE 4d

The catalyst detailed in example 4a was tested under atmospheric pressure with only hydrogen as carrier gas. The olefin content was reduced by 65%.

The rare-earth loaded zeolite was promoted with group I metal (alkali metal) such as Cesium.

EXAMPLE 5a

1% Cesium was loaded as promoter to 5% lanthanum H-ZSM-5 and the reaction was conducted at 400° C. under atmospheric pressure with nitrogen as carrier gas. The olefin content was reduced by 67%.

EXAMPLE 5b

The catalyst listed in example 5a was tested with hydrogen as a carrier gas and the olefin content was reduced by 57%.

From the above results it is observed that the zeolite based catalyst composition of the present disclosure is effective in reducing olefin content in the hydrocarbon stream.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

The use of the expression "at least" or "at least one" suggests the use of one or more elements or ingredients or quantities, as the use may be in the embodiment of the disclosure to achieve one or more of the desired objects or results.

Any discussion of documents, acts, materials or the like that has been included in this specification is solely for the purpose of providing a context for the disclosure. It is not to be taken as an admission that any or all of these matters form a part of the prior art base or were common general knowledge in the field relevant to the disclosure as it existed anywhere before the priority date of this application.

The numerical values mentioned for the various physical parameters, dimensions or quantities are only approximations and it is envisaged that the values higher/lower than the numerical values assigned to the parameters, so dimensions or quantities fall within the scope of the disclosure, unless there is a statement in the specification specific to the contrary.

While considerable emphasis has been placed herein on the specific features of the preferred embodiment, it will be appreciated that many additional features can be added and that many changes can be made in the preferred embodiment without departing from the principles of the disclosure. These and other changes in the preferred embodiment of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. A process for reducing olefin content in a hydrocarbon stream said process comprising the following steps;
   i. providing at least one hydrocarbon stream comprising olefins in an amount ranging from about 0.01 up to about 70 w/w %, and
   ii. contacting said at least one hydrocarbon stream with the a catalyst composition comprising at least one rare earth metal in the range of from about 0.1 w/w % up to about 20 w/w % and at least one zeolite wherein a ratio of $SiO_2$ to $Al_2O_3$ in said zeolite ranges from about 1:20 up to about 1:450, at a temperature of from about 350° C. up to about 450° C., and at a pressure of from about 1 bar up to about 20 bars in the presence of at least one carrier gas to obtain the hydrocarbon stream comprising at least 40 w/w % reduced olefin content.

2. The process as claimed in claim 1, wherein the method step of contacting is carried out in a fixed bed reactor at a flow rate of said at least one hydrocarbon stream ranging from about 10 ml/h up to about 14 ml/h and a space velocity ranging from about 8 WHSV (weight hourly space velocity) up to about 10 WHSV.

3. The process as claimed in claim 1, wherein the at least one hydrocarbon stream is at least one selected from the group consisting of gasoline, vacuum gas oil (VGO), light cycle oil (LCO), naphtha and C4 to C12 olefins and the at least one carrier gas is at least one selected from the group consisting of nitrogen and hydrogen.

4. The process as claimed in claim 1, wherein said at least one rare earth metal is impregnated in said at least one zeolite.

5. The process as claimed in claim 1, wherein the at least one rare earth metal is selected from the group consisting of scandium, yttrium, lanthanum, praseodymium, neodymium, promethium, samarium, europium, gadolinium, terbium, dysprosium, holmium, erbium, thulium, ytterbium and lutetium and said at least one rare earth metal is in a salt form selected from the group consisting of chloride, bromide, fluoride, iodide, sulfates, phosphates, phosphonates, nitrates, nitrites, carbonates, acetates, bicarbonates, hydroxides and oxides.

6. The process as claimed in claim 1, wherein the at least one zeolite is selected from the group consisting of ZSM-5, ZSM-11, ZSM-12, ZSM-22, ZSM-23, ZSM-48, ZSM-57, SAPO-5, SAPO-11, SAPO-17, SAPO-18, SAPO-34, SAPO-44, ferrierite, mordenite, beta and zeolite Y.

7. The process as claimed in claim 1 further comprises at least one promoter selected from the group consisting of cerium, niobium, cesium, sodium, potassium, and rubidium in an amount ranging from 0.01 to 1.5 w/w %.

* * * * *